Figure 1:
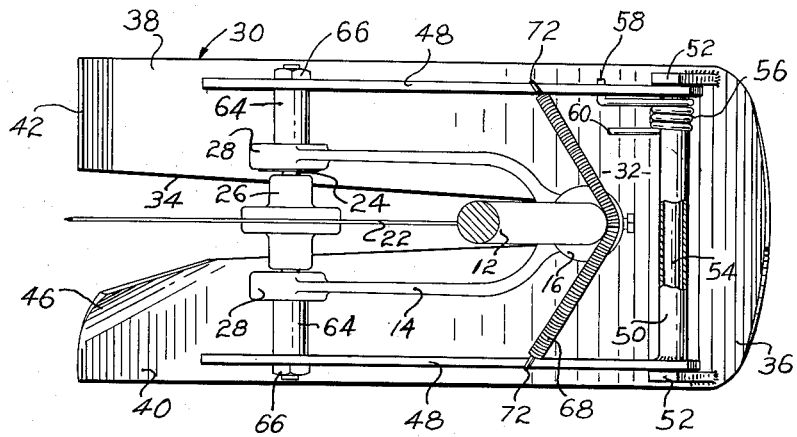

June 20, 1961 R. SISK 2,989,129
SPRING PRESSED COLTER SHOE
Filed Nov. 10, 1958

INVENTOR.
Ralph Sisk
BY
ATTORNEY

United States Patent Office 2,989,129
Patented June 20, 1961

2,989,129
SPRING PRESSED COLTER SHOE
Ralph Sisk, Orrick, Mo.
Filed Nov. 10, 1958, Ser. No. 772,765
4 Claims. (Cl. 172—515)

This invention relates to an improved attachment for farm implements, and more particularly to a trash shoe adapted for removable attachment to the rolling colter unit of a plow and operable to press all stalks, grasses, hay and other trash tightly against the ground ahead of the plow to prevent its accumulation and entanglement around the plow beam and/or the colter-supporting shank.

It is the most important object of the present invention to provide novel structure for swingably mounting a trash shoe as defined above on the rolling colter disc shank connected to a plow beam in a manner permitting the trash shoe plate to swing through a sufficient arc relative to the colter unit to remain in sliding engagement with the ground during advancement of the plow, irrespective of vertical movement of the colter beam relative to the ground and thereby assuring effective operation of the trash shoe over all types of terrain. It is a particularly important object to provide structure for swingably mounting a trash shoe similar to the construction shown in my co-pending application, Serial No. 726,682, filed April 7, 1958 now Patent No. 2,942,675 and entitled Trash Shoe For Rolling Colters, the present application being a continuation-in-part thereof, the trash shoe defined in the aforementioned co-pending application being suitable under many field conditions encountered, but it was found that improved prevention of trash accumulation by utilization of the trash shoe could be obtained by providing means permitting the trash shoe plate to remain in firm engagement with the ground, notwithstanding vertical reciprocation of the colter shank as the plow was advanced.

It is another important object of the invention to provide structure for swingably mounting a trash shoe on a rolling colter unit wherein the trash shoe plate is permitted to swing about two parallel, horizontally spaced axes to thereby assure firm engagement of the shoe with the ground under all types of irregular terrain encountered.

Also an important object is to provide means yieldably connecting the mounting structure for the trash shoe to the rolling colter shank to thereby maintain the upwardly flared, forwardmost end of the trash shoe plate in a substantially upright position clearing the trash as the plow is advanced.

A further important aim of the invention is to provide simple and efficient mounting structure for a trash shoe as described which may be manufactured at a minimum cost and is designed to permit the trash shoe to be mounted on various types of plows and without modification of the trash shoe being required.

Other important objects and details of construction of the instant invention will become obvious or be explained more fully as the following specification progresses.

Figure 2:
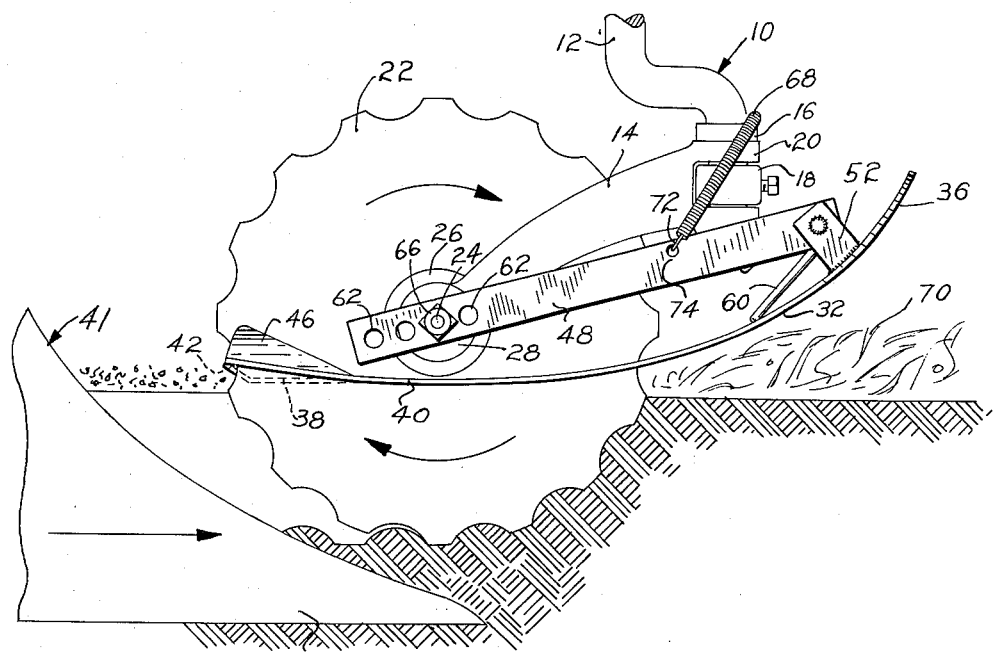

In the drawing:
FIGURE 1 is a horizontal, cross-sectional view through the supporting shank of a rolling colter presenting, therefore, a top plan view of the trash shoe and novel mounting structure for the same forming the subject matter of the instant invention; and FIG. 2 is a vertical, cross-sectional view through the ground illustrating the trash shoe, the mounting structure therefor and the relationship of the components to the plowshare and the rolling colter.

The rolling colter unit 10 chosen for illustration conventionally includes a shank 12 that depends from the beam (not shown) of a plow, and which shank 12 supports a yoke 14 for horizontal swinging movement between a collar 16 on shank 12 and a set collar 18 interposed between the bifurcated section 20 of yoke 14. Yoke 14 in turn rotatably supports a colter disc 22 through the medium of an axle 24 passing through hub 26 rigid to disc 22 and in turn rotatably carried by opposed, axially aligned bearing segments 28 of yoke 14.

Trash shoe 30 preferably includes an initially flat, elongated plate 32 having a slot or notch 34 extending longitudinally thereof from the normally rearmost end of plate 32 and terminating adjacent an upwardly flared, forwardmost end 36. The notch 34 is preferably V-shaped and sufficiently long to accommodate discs 22 of various diameters, presenting a pair of elongated, substantially parallel fingers 38 and 40, one on each side respectively of disc 22. The rearmost end 42 of finger 38 is flared upwardly, as best shown in FIG. 2, and preferably constitutes a rectangular planar section disposed at an angle to the major segment of finger 38. Finger 40, which is proximal to the land side 44 of plowshare 41, has an upwardly flared, substantially triangular section 46 in proximity to notch 34 for clearing the ground that is constantly being raised by plowshare 41 during advancement of the plow.

Structure for mounting trash shoe 30 on colter unit 10 and constituting the subject matter of this application, includes a pair of elongated, substantially parallel members 48 interconnected at corresponding forwardmost ends thereof by a tubular sleeve 50 welded to the innermost surfaces of respective members 48. Sleeve 50 is preferably of sufficient length to cause members 48 to be in relatively close proximity to adjacent longitudinal margins of plate 32 when members 48 and sleeve 50 are pivotally connected to plate 32.

A pair of upright, transversely aligned ears 52 are welded to the uppermost surface of the upwardly flared, forwardmost end 36 of plate 32 and are transversely aligned with rod 54 welded to the same and spanning the distance therebetween, being rotatably received by sleeve 50 as clearly shown in FIG. 1, to thereby swingably mount members 48 on ears 52 for rotation about the longitudinal axis of rod 54. Coil spring 56 surrounding sleeve 50 adjacent one of the members 48 has a substantially L-shaped leg section 58 engaging the lower longitudinal edge of the defined proximal member 48, while the opposite leg section 60 of coil spring 56 bears against the upper face of plate 32 to thereby bias trash shoe 30 downwardly about the axis of rod 54.

It is preferred that axle 24 of disc 22 be of sufficient length to extend outwardly from opposed bearing segments 28 and be externally threaded at such outermost ends to facilitate swingable mounting of members 48 on bearing segments 28 of yoke 14. In this manner, members 48 may be provided with a plurality of opposed, axially aligned openings 62 of sufficient size to receive opposed outer ends of axle 24, with sleeves 64 interposed between respective bearings 28 and proximal ends of members 48 maintaining the latter in correct spaced relationship relative to yoke 14. Nuts 66, complementally threaded over the outermost ends of axle 24, permit members 48 to swing relative to yoke 14, it being recognized that the outer ends of members 48 remote from sleeve 50 may be spread slightly in order to clear the outer ends of axle 24 until such extremities may be received within a desired pair of openings 62 in members 48. It is to be pointed out that, since axle 24 of disc 22 may vary according to the type of colter employed, it is to be preferred that the series of openings 62 in each member 48 be of differing diameters and configuration to accommodate colter axles of the most commonly available sizes. It also can be appreciated that if axle 24 is relatively short, adapter means may be readily provided with trash shoe 30 and the mounting structure therefor for securing members 48 to axle 24 in a manner to permit plate 32 to swing relative to yoke 14.

An elongated coil spring 68 is provided to maintain the forwardmost end 36 of trash shoe 30 in an upwardly tilted position clearing trash 70 as the plow is advanced, hooks 72 on opposed ends of spring 68 being removably disposed within transversely aligned openings 74 in respective members 48 intermediate sleeve 50 and openings 62, while the central portion of coil spring 68 is looped over unit 10, particularly adjacent the zone of connection between yoke 14 and shank 12. As illustrated, the central portion of spring 68 is looped over the uppermost collar 16. It is to be understood, however, that openings 74 may be disposed in closer proximity to sleeve 50 and the central portion of spring 68 thereby disposed rearwardly of collar 16 within the substantially U-shaped area defined by the legs of yoke 14 and the curved section of shank 12, as clearly indicated in FIG. 2.

It can now be seen that during forward advancement of the plow, the trash shoe 30 remains in firm engagement with the ground on each side of disc 22, irrespective of vertical reciprocation of colter unit 10 occasioned because of irregularities in the surface of the terrain or because of the manner in which the plowshare 41 is pulled through the ground. As shank 12 and thereby yoke 14 move upwardly in response to vertical movement of the plow beam, ears 52 pivot about the axis of sleeve 50, thereby causing the lower surfaces of fingers 38 and 40 to remain in firm engagement with the trash 70 on the ground. Spring 56 surrounding sleeve 50 assures engagement of plate 32 with the ground without vibration and bouncing of the same because of clumps of trash 70 or high points in the surface configuration of the terrain.

The structure mounting trash shoe 30 on colter unit 10 also permits pivoting of members 48 about axle 24 against the action of spring 68 when the irregular ground causes the rearmost ends of fingers 38 and 40 to be moved upwardly and about a fulcrum presented by bearing segments 28 of yoke 14. In this case, spring 68 permits limited downward swinging movement of the forwardmost end 36 of trash shoe 30 but prevents such forward end from moving downwardly to such an extent as not to clear trash 70 during advancement of the plow.

The use of trash shoe 30 is illustrated in FIG. 2 of the drawing, showing how plate 32 slides over trash 70 to press the latter tightly to the ground. Entanglement by the trash 70 with unit 10 is prevented and adequate coverage of the plowed ground is permitted before trash 70 is able to collect around the beam of the plow.

The trash shoe 30 may be quickly and easily dismounted from colter unit 10 as desired and placed on another plow and, by the same token, a different colter disc 22 may be easily placed on shank 12 when desired without placement of trash shoe 30 on the plow requiring material additional work.

Having thus described the invention what is claimed as new and desired to be secured by Letters Patent is:

1. In a trash shoe for use with a plow having a rolling colter unit including a colter disc suspended from the plow beam forwardly of the plowshare by a shank having a yoke swingable horizontally thereon and receiving the disc through the medium of an axle and said shoe including an elongated plate having a longitudinal slot therein for clearing the colter disc beneath said axle, provided with an upwardly flared, forwardmost end and adapted to slide on the ground forwardly of the plowshare, the combination with said plate of structure mounting the same on the unit and including a pair of elongated, spaced, parallel members, a pair of upright, spaced ears secured to the upper surface of the plate in transversely aligned relationship adjacent said forwardmost end thereof, pivot means swingably securing one end of each of the members to a corresponding ear for swinging movement on a common axis, means adapted for pivotally securing the opposite ends of the members to opposed, corresponding ends of said colter disc axle whereby the plate swings relative to the unit through a sufficient arc to remain in sliding engagement with the ground during advancement of the plow and irrespective of vertical movement of the beam relative to the ground, and elongated spring means secured at opposite ends thereof to respective members intermediate the ends of the same and adapted to be looped over said unit adjacent the connection between the shank and yoke for limiting the extent of downward swinging movement of said forwardmost end of the plate relative to the unit.

2. In a trash shoe for use with a plow having a rolling colter unit including a colter disc suspended from the plow beam forwardly of the plowshare by a shank having a yoke swingable horizontally thereon and receiving the disc through the medium of an axle rotatably carried by opposed, axially aligned bearing segments of said yoke, and said shoe including an elongated plate having a longitudinal slot therein for clearing the colter disc beneath said axle, provided with an upwardly flared, forwardmost end and adapted to slide on the ground forwardly of the plowshare, the combination with said plate of structure mounting the same on the unit and including opposed, elongated components swingably secured to the axle for rotation about the axis of said disc and extending forwardly from said axis, means pivotally securing the forward end of said plate to the outer extremities of said components remote from said axis, connector means joined to said components and the shank respectively for yieldably biasing the components and thereby said forward end of the plate upwardly toward the shank, and yieldable means interposed between said components and the plate for biasing the rear end of the latter downwardly toward the ground whereby the plate remains in sliding engagement with the ground during advancement of the plow and irrespective of vertical movement of the unit relative to the ground.

3. Structure as set forth in claim 2 wherein said connector means includes a spring releasably secured to said opposed components intermediate the points of pivotal connection of said components to said plate and the shank at the axis of rotation of the disc, said spring passing over a portion of the unit in a position to bias the forwardmost end of the plate toward said shank.

4. Structure as set forth in the claim 3 wherein said yieldable means comprises a second spring engaging said components and the upper face of the plate for biasing the plate downwardly relative to the unit.

References Cited in the file of this patent

UNITED STATES PATENTS

| | | |
|---|---|---|
| 1,545,895 | Hamilton | July 14, 1925 |
| 2,161,714 | Lindelof | June 6, 1939 |
| 2,280,107 | Stute | Apr. 21, 1942 |
| 2,391,910 | Lutes | Jan. 1, 1946 |

FOREIGN PATENTS

| | | |
|---|---|---|
| 602,391 | Great Britain | May 26, 1948 |